J. OCKEN, Jr.
TOOTHPICK HOLDER.
APPLICATION FILED MAR. 31, 1915.
1,162,874.
Patented Dec. 7, 1915.
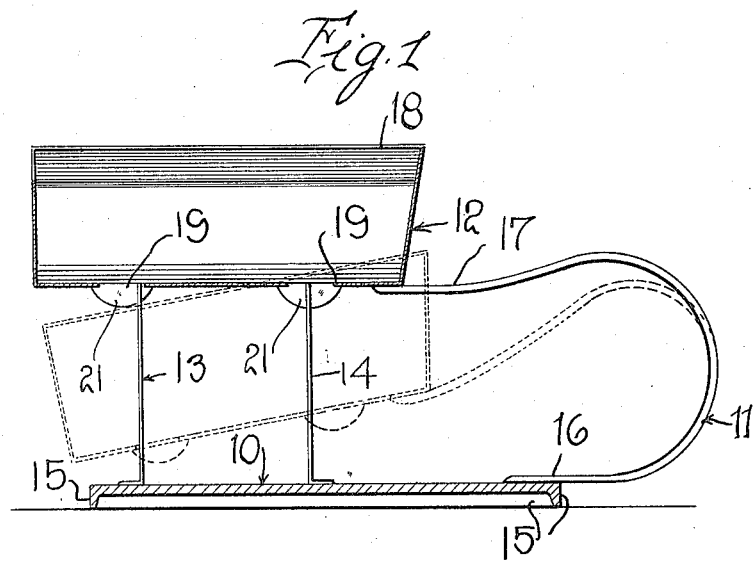
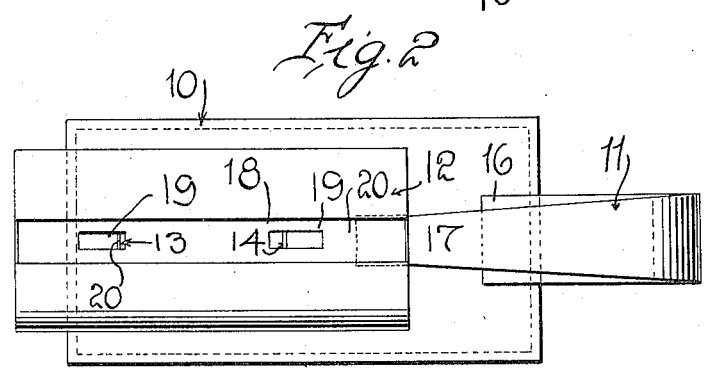
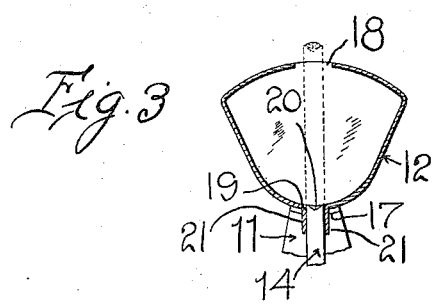
Inventor
JOHN OCKEN JR.
By Watson E. Coleman
Attorney

UNITED STATES PATENT OFFICE.

JOHN OCKEN, JR., OF ARCADIA, IOWA.

TOOTHPICK-HOLDER.

1,162,874.　　　　　Specification of Letters Patent.　　　Patented Dec. 7, 1915.

Application filed March 31, 1915. Serial No. 18,353.

*To all whom it may concern:*

Be it known that I, JOHN OCKEN, Jr., a citizen of the United States, residing at Arcadia, in the county of Carroll and State of Iowa, have invented certain new and useful Improvements in Toothpick-Holders, of which the following is a specification, reference being had to the accompanying drawings.

My present invention relates to new and useful improvements in tooth pick holders and as its principal object aims to provide a device of this character which may be easily and conveniently manipulated to project the tooth picks, one at a time, from within the receptacle within which they are placed in bulk.

A more specific object of the invention is to provide a tooth pick holder which consists essentially in a base plate, a receptacle for the picks, a spring which constitutes a handle whereby the device may be transported and also serves to maintain the receptacle in spaced relation to the base, and a pair of projector prongs which rise from the base and extend into the receptacle for projecting a pick therefrom, when the handle is manipulated to move the receptacle toward the base.

Another object is to provide a device having the above characteristics, which is simple in construction and may, therefore, be cheaply manufactured and is adapted for use in an easy and convenient manner.

The above, and other incidental objects of a similar nature, which will be hereinafter more specifically treated are accomplished by such means as are illustrated in the accompanying drawings, described in the following specification, and then more particularly pointed out in the claims which are appended hereto and form part of this application.

With reference to the drawings, wherein there has been illustrated the preferred embodiment of this invention, as it is reduced to practice, and throughout the several views of which similar reference numerals designate corresponding parts, Figure 1 is a longitudinal section taken through the holder, the receptacle being illustrated in normal position in solid lines, and being indicated in depressed position by dotted lines; Fig. 2 is a top plan view; and Fig. 3 is a transverse section taken through the receptacle, the projector prongs being indicated by dotted lines in the position which they assume when a pick is projected from the receptacle.

As best disclosed as an operative entirety in Fig. 1 of the accompanying drawings, the tooth pick holder of the present invention includes as its essential elements of construction, a base plate 10, a handle 11, a pick receptacle 12, and a pair of projector prongs 13 and 14.

The base plate is preferably rectangular in shape and is formed from a single blank of sheet metal, the edges of which are bent over a former to produce the flanges 15. Of course, if so desired, the base member may be formed as a solid block and from any material which may be deemed suitable for the purpose.

The handle heretofore designated by the numeral 11 is formed from a single strip of spring metal which is bent into a U, the lower arm of which, indicated at 16, is riveted, soldered or secured in any other desired manner to the base plate and the upper arm 17 of which is attached in a similar manner to the bottom of the receptacle 12.

The receptacle 12 is preferably formed in the nature of a trough-like sheet metal shell, in which is formed a longitudinally extending opening 18, through which the prongs are projected when the handle is depressed in a manner which will be hereinafter more fully described. In the bottom wall of the receptacle are formed a pair of elongated, spaced slots 19 which are longitudinally disposed and receive the prongs 13 and 14. These prongs are longitudinally spaced on the base plate and are of such length that their upper terminals project only a slight distance into the receptacle 12 when this member is in normal position. The upper terminals of the prongs are bifurcated, as indicated at 20 in Fig. 3 so that but a single tooth pick will be projected through the opening 18 at one time. The receptacle 12 is formed on its bottom with two pairs of laterally spaced and longitudinally extending depending guides 21 defining the opposite side walls of the slots 19, and embracing and engaging the projecting prongs 13 and 14, as clearly illustrated in Figs. 1 and 3, whereby the prongs and receptacle will be maintained in proper relation to each other during the movement of the latter.

From the foregoing description, and upon reference to the accompanying drawings, it will now be seen that the operator may, by squeezing the handle, move the receptacle toward the base plate, with the resultant projecting of the upper terminals of the prongs through the opening 18. Due to the trough-like shape of the receptacle, a tooth pick is always lodged in the bifurcated terminals of the prongs, when the receptacle is in normal elevated position so that upon the depression of this member, one pick will be withdrawn from the receptacle, as disclosed best in Fig. 3.

I desire to direct particular attention to the fact that the rear wall of the receptacle inclines away from the vertical, when the receptacle is in normal position so that when the receptacle is depressed, the rear wall will lie in a vertical plane and will not interfere with the removal of the picks.

In reduction to practice, it has been found that the form of this invention illustrated in the drawings, and referred to in the above description as the preferred embodiment, is the most efficient and practical; yet realizing that the conditions concurrent with the adoption of this device will necessarily vary, it is desirable to emphasize the fact that various minor changes in the details of construction, proportion and arrangement of parts may be resorted to, when required, without sacrificing any of the advantages of this invention, as defined by the appended claims.

What is claimed is:—

1. A holder of the character described, comprising a base plate, a receptacle, a U-shaped spring handle secured at one end to the base plate and at its other end to the receptacle, and constituting a yielding support for the latter, the receptacle being formed in its bottom with longitudinally spaced slots, and in its top with a longitudinally disposed opening in registry with said slots, and projector prongs secured to and extending upwardly from the base plate into the slots, as and for the purpose set forth.

2. A holder of the character described, comprising a base plate, a receptacle, a bowed spring handle connected at one end to the base plate and at its other end to the receptacle and forming the sole means for yieldingly supporting the latter, the receptacle being formed in its bottom with longitudinally spaced slots and in its edge with a longitudinal opening in registry with said slots, and the bottom of the receptacle being formed with laterally spaced and longitudinally disposed depending guide members defining the opposite side walls of said slots, and stationary projector prongs secured at their lower ends in longitudinally spaced relation to each other, upon the base plate and extending upwardly therefrom into said slots between the guides.

In testimony whereof I hereunto affix my signature in the presence of two witnesses.

JOHN OCKEN, Jr.

Witnesses:
A. STEPHENSON,
M. J. DAEGES.

Copies of this patent may be obtained for five cents each, by addressing the "Commissioner of Patents, Washington, D. C."